UNITED STATES PATENT OFFICE 1,964,158

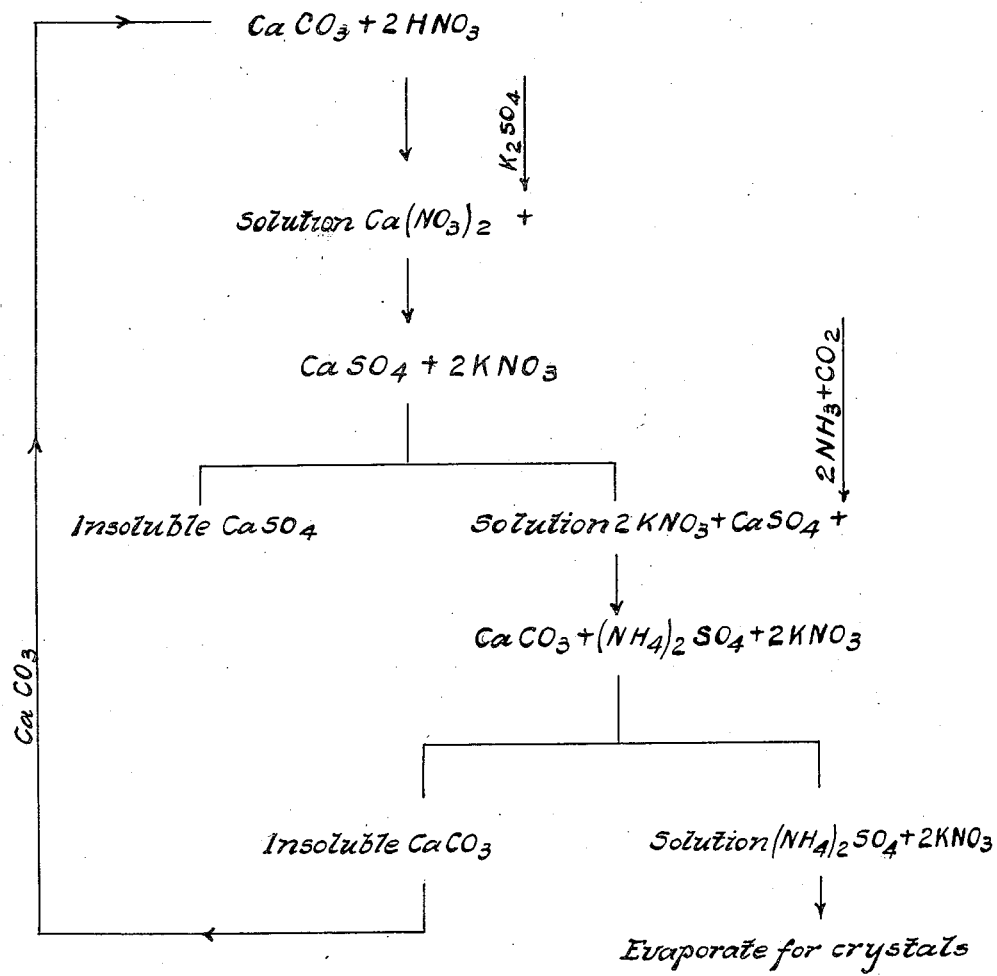

PROCESS FOR THE SIMULTANEOUS PRODUCTION OF POTASSIUM NITRATE AND AMMONIUM SULPHATE

August Holz, Irvington, N. J.

Application August 19, 1930, Serial No. 476,449

3 Claims. (Cl. 71—9)

This invention relates to a process for the simultaneous production of potassium nitrate and ammonium sulphate.

One advantage of the hereinafter described process is that a much purer product is obtained.

A further advantage of my new method is that a by-product is now converted into a valuable constituent.

Other advantages of my new process will appear from the description herein, and it will be obvious that modifications may be made in my new process without departing from the spirit thereof or the scope of the appended claims.

My method is based upon the principle that calcium nitrate and potassium sulphate or bisulphate react with one another to form relatively insoluble calcium sulphate and easily soluble potassium nitrate. This reaction is represented by the following formula:

$$Ca(NO_3)_2 + K_2SO_4 = CaSO_4 + 2KNO_3 \quad \text{(Formula I)}$$

While a large part of the calcium sulphate is thrown down as a precipitate, considerable calcium sulphate remains dissolved in the mother liquor and will contaminate the potassium nitrate crystals formed in the concentration and evaporation or this mother liquor.

The accompanying drawing shows the flow sheet illustrating the invention.

When using potassium bisulphate the reaction proceeds according to the following formula:

$$Ca(NO_3)_2 + 2KHSO_4 =$$
$$CaSO_4 + H_2SO_4 + 2KNO_3 \quad \text{(II)}$$

In this case even larger quantities of calcium sulphate are retained in the solution owing to the present of free sulphuric acid. I have, however, dscovered a method whereby calcium is not only removed completely but the sulphuric acid radical is detached from it and converted into a useful compound, recognized as a valuable fertilizer ingredient.

When into this mother liquor containing calcium sulphate (Formula I) ammonia gas and carbon dioxide are passed the dissolved calcium sulphate will immediately react with the ammonium carbonate and insoluble calcium carbonate and soluble ammonium sulphate are formed in accordance with the following formula:

$$CaSO_4 + (NH_4)_2CO_3 =$$
$$CaCO_3 + (NH_4)_2SO_4 \quad \text{(Formula III)}$$

In the mother liquor of Formula II the free sulphuric acid is first neutralized with ammonia and then ammonia and carbon dioxide are passed into it until the calcium is removed completely as carbonate. The reaction in this case proceeds according to the following formula:

$$CaSO_4 + H_2SO_4 + 2KNO_3 \text{ (Formula II)} + 2NH_4OH$$
$$+ 2(NH_4)_2CO_3 = CaCO_3 + 2KNO_3 + 2(NH_4)_2SO_4$$

The process is therefore carried out as follows: to a concentrated solution of calcium nitrate (or calcium nitrate and sodium nitrate) is added the theoretical amount of potassium sulphate or bisulphate. The resulting precipitate of calcium sulphate may then be removed by filtration.

Into the filtrate ammonia gas and carbon dioxide are then passed simultaneously until the calcium is completely precipitated as carbonate.

The precipitate of calcium carbonate is then removed by filtration and the mother liquor of potassium nitrate and ammonium sulphate is concentrated and converted into solids in the usual manner.

If synthetic calcium nitrate is used the final products of my process are therefore $2KNO_3$ plus $(NH_4)_2SO_4$ in the case of potassium sulphate, or $2KNO_3$ plus $2(NH_4)_2SO_4$ in the case of bisulphate. If, however, calcium nitrate obtained from the conversion of Chilean nitrates is used, the product naturally contains considerable sodium nitrate.

I claim:

1. The method which comprises treating calcium nitrate with potassium sulphate, removing the precipitated calcium sulphate by filtration and then passing into the mother liquor ammonia and carbon dioxide until all calcium is converted into carbonate, removing this carbonate by filtration and evaporating the mother liquor for the production of potassium nitrate and ammonium sulphate.

2. The method which comprises treating calcium nitrate with potassium sulphate, removing the precipitated calcium sulphate by filtration, passing into the liquid reaction product ammonia and carbon dioxide under slight pressure until all the calcium is converted into carbonate, removing the precipitated calcium carbonate by filtration and evaporating the mother liquor for potassium nitrate and ammonium sulphate.

3. The method which comprises treating calcium nitrate with potassium bisulphate, passing into the reaction product gaseous ammonia until all free acid is neutralized, then passing ammonia simultaneously with carbon dioxide into the mixture under slight pressure and continual agitation, removing the precipitated calcium carbonate by filtration and evaporating the mother liquor for the production of potassium nitrate and ammonium sulphate.

AUGUST HOLZ.